United States Patent
Smith (10) Patent No.: US 9,527,440 B2
(45) Date of Patent: Dec. 27, 2016

(54) TECHNOLOGIES FOR VEHICLE TURN BLINKER AUDIO AND DISPLAY PROCESSING

(71) Applicants: VOLKSWAGEN AG, Wolfsburg (DE); AUDI AG, Ingolstadt (DE)

(72) Inventor: Shea Smith, Hayward, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 8 days.

(21) Appl. No.: 14/583,877

(22) Filed: Dec. 29, 2014

(65) Prior Publication Data

US 2016/0185282 A1    Jun. 30, 2016

(51) Int. Cl.
*B60Q 9/00* (2006.01)
*B60Q 1/38* (2006.01)

(52) U.S. Cl.
CPC .. *B60Q 9/00* (2013.01); *B60Q 1/38* (2013.01)

(58) Field of Classification Search
CPC ....... B60Q 2300/142; B60Q 1/26; B60Q 1/34; B60Q 1/1461; B60Q 5/00; B60Q 5/001; B60Q 5/003; B60Q 5/005; B60Q 9/00; B60Q 1/38
See application file for complete search history.

(56) References Cited

U.S. PATENT DOCUMENTS

| | | | |
|---|---|---|---|
| 6,426,695 B2 | 7/2002 | Pagano et al. | |
| 7,170,400 B2 * | 1/2007 | Cowelchuk | B60R 16/037 340/4.3 |
| 7,406,421 B2 * | 7/2008 | Odinak | G10L 15/22 701/36 |
| 7,876,209 B2 * | 1/2011 | Kracker | B60Q 5/00 340/384.1 |
| 2013/0077338 A1 * | 3/2013 | Wenzel | B60Q 3/004 362/551 |

FOREIGN PATENT DOCUMENTS

| | | |
|---|---|---|
| DE | 19641493 A1 | 4/1998 |
| DE | 29922789 U1 | 3/2000 |
| DE | 202006018694 U1 | 2/2007 |
| EP | 1920975 A1 | 5/2008 |
| JP | 02287799 | 11/1990 |
| JP | 2000272414 A | 10/2000 |
| JP | 2013173466 A | 9/2013 |

OTHER PUBLICATIONS

RD 414028 A, Oct. 10, 1998, Anonymous.
Extended European Search Report for European Patent Application No. EP 15201698.1 dated Mar. 11, 2016.

* cited by examiner

*Primary Examiner* — Brian Zimmerman
*Assistant Examiner* — Sara Samson
(74) *Attorney, Agent, or Firm* — Barnes & Thornburg LLP (57) ABSTRACT

A system and method for processing turn signal data for a vehicle. A turning signal module may activate a turn signal for the vehicle, while a turning audio module generates audio indicia in response to the turn signal module activating the turn signal, and a turning display module generates visual indicia in response to the turn signal module activating the turn signal. A processor may receive and process vehicle data to determine a vehicle characteristic, where the processor may be configured to provide modification data to modify one or more audio characteristics of the audio indicia generated by the turning audio module and/or one or more visual characteristics of the visual indicia generated by the turning display module in response to the determined vehicle characteristic.

16 Claims, 5 Drawing Sheets

TECHNOLOGIES FOR VEHICLE TURN BLINKER AUDIO AND DISPLAY PROCESSING

BACKGROUND

The present disclosure is directed to vehicle turning component audio control. More specifically, the present disclosure is directed to controlling audio generated from a turning audio module triggered by a turn switch, such as a vehicle turn stalk and the like.

Turn signal technology has existed in the vehicle industry for many years. In typical vehicle turn signal arrangements, a turn switch (e.g., turn stalk, locate in a turn wheel column) activates a turning signal mechanism in which visual indicia (e.g., blinking left/right arrows) and audio indicia (e.g., turn signal clicking) is provided to indicate to a driver whether a turn signal has been activated, and in which direction the turn signal is set. While conventional turn signal technology adequately provides notification of a turn signal condition, such notification is not always desired by a driver, and can become an annoyance when persistent turn signal audio is present.

SUMMARY

In one embodiment, a system is disclosed for processing turn signal data for a vehicle, comprising a turning signal module for activating a turn signal for the vehicle; a turning audio module for generating audio indicia in response to the turn signal module activating the turn signal; a turning display module for generating visual indicia in response to the turn signal module activating the turn signal; and processing means for receiving and processing vehicle data to determine a vehicle characteristic, wherein the processing means is configured to provide modification data to modify at least one of (i) one or more audio characteristics of the audio indicia generated by the turning audio module and (ii) one or more visual characteristics of the visual indicia generated by the turning display module in response to the determined vehicle characteristic, wherein the processing means is configured to modify the audio characteristics by modifying at least one of a volume and a frequency of the audio characteristic, and wherein the processing means is configured to modify the visual characteristics by modifying at least one of an illumination and a graphic display of the visual characteristic.

In another embodiment, a method is disclosed for processing turn signal data for a vehicle, comprising activating, by a turning signal module, a turn signal for the vehicle; processing, by a processor, vehicle data to determine a vehicle characteristic; and providing, by the processor, modification data in response to the determined vehicle characteristic to modify at least one of (i) one or more audio characteristics of audio indicia generated by a turning audio module in response to the turn signal module activating the turn signal, and (ii) one or more visual characteristics of visual indicia generated by a turning display module in response to the turn signal module activating the turn signal.

In another embodiment, a system is disclosed for processing turn signal data for a vehicle, comprising a turning signal module for activating a turn signal for the vehicle; a turning audio module for generating audio indicia in response to the turn signal module activating the turn signal; a turning display module for generating visual indicia in response to the turn signal module activating the turn signal; and a processor for receiving and processing vehicle data to determine a vehicle characteristic, wherein the processor is configured to provide modification data to modify at least one of (i) one or more audio characteristics of the audio indicia generated by the turning audio module and (ii) one or more visual characteristics of the visual indicia generated by the turning display module in response to the determined vehicle characteristic.

BRIEF DESCRIPTION OF THE FIGURES

The present invention is illustrated by way of example and not limitation in the figures of the accompanying drawings, in which like references indicate similar elements and in which.

DETAILED DESCRIPTION

Exemplary embodiments will now be described more fully with reference to the accompanying drawings.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that exemplary embodiments may be embodied in many different forms and that neither should be construed to limit the scope of the disclosure. In some exemplary embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

It will also be understood that the term "module" as used herein does not limit the functionality to particular physical modules, but may include any number of tangibly-embodied software and/or hardware components. For example the various modules, logic, and other components of the present disclosure may form a portion of, or otherwise be established by, a processor (e.g., processor 107) or other hardware components of a vehicle. Also, in some embodiments, one or more of the modules disclosed herein may be embodied as a circuit. In general, a computer program product in accordance with one embodiment comprises a tangible computer usable medium (e.g., standard RAM, an optical disc, a USB drive, or the like) having computer-readable program code embodied therein, wherein the computer-readable program code is adapted to be executed by a processor (working in connection with an operating system) to implement one or more functions and methods as described below. In this regard, the program code may be implemented in any desired language, and may be implemented as machine code, assembly code, byte code, interpretable source code or the like (e.g., via C, C++, C#, Java, Actionscript, Objective-C, Javascript, CSS, XML, etc.). Furthermore, the various modules of the environment 200 may be embodied as hardware, firmware, software, or a combination thereof.

Various embodiments will be described herein below with reference to the accompanying drawings. In the following description, well-known functions or constructions are not described in detail since they may obscure the invention in unnecessary detail.

Figure 1:
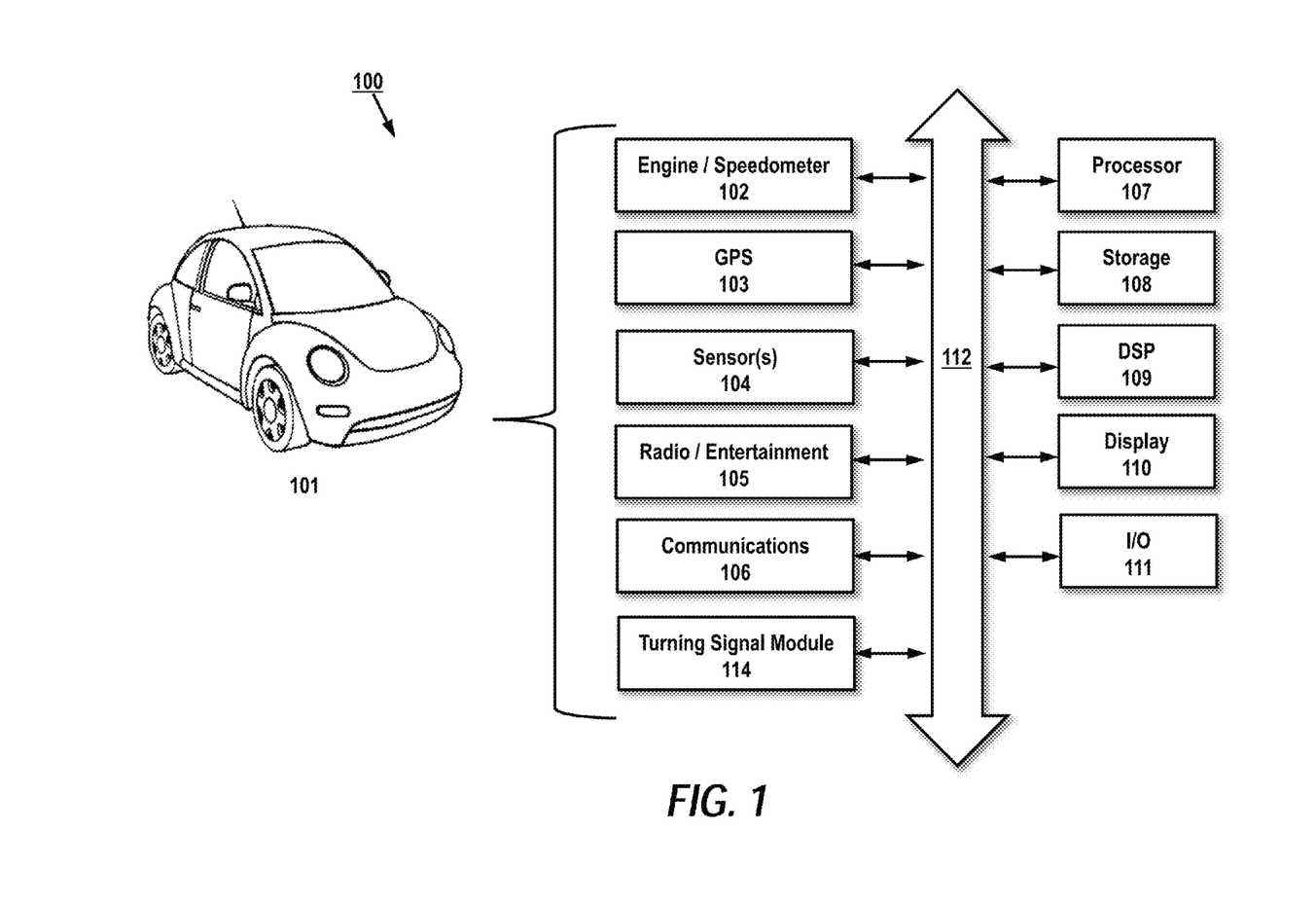
FIG. 1 illustrates an illustrative vehicle system block diagram showing multiple components and modules, together with a navigational system under one embodiment.

Turning to FIG. 1, the drawing illustrates an exemplary vehicle system 100 for a vehicle 101 comprising various vehicle electronics modules, subsystems and/or components. Engine/transmission module 102 is configured to process and provide vehicle engine and transmission characteristic or parameter data, and may comprise an engine control unit (ECU), and a transmission control. For a diesel engine, module 102 may provide data relating to fuel injection rate, emission control, NOx control, regeneration of oxidation catalytic converter, turbocharger control, cooling system control, and throttle control, among others. For a gasoline engine, module 102 may provide data relating to lambda control, on-board diagnostics, cooling system control, ignition system control, lubrication system control, fuel injection rate control, throttle control, and others. Transmission characteristic data may comprise information relating to the transmission system and the shifting of the gears, torque, and use of the clutch. Under one embodiment, an engine control unit and transmission control may exchange messages, sensor signals and control signals.

Global positioning system (GPS) and navigation module 103 provides navigation processing and location data for vehicle 101. Sensors 104 provides sensor data which may comprise data relating to vehicle characteristic and/or parameter data (e.g., from 102), and may also provide environmental data pertaining to the vehicle, its interior and/or surroundings, such as temperature, humidity and the like. Other sensors may include proximity sensors and/or cameras for sensing objects and/or traffic proximate to vehicle 101. Still further sensors may include one or more microphones for sensing ambient audio within vehicle 101. Radio/entertainment module 105 may provide data relating to audio/video media being played in vehicle 101. Module 105 may be integrated and/or communicatively coupled to an entertainment unit configured to play AM/FM radio, satellite radio, compact disks, DVDs, digital media, streaming media and the like. Communications module 106 allows any of the modules to communicate with each other and/or external devices via a wired connection or wireless protocol, such as LTE, 3G, Wi-Fi, Bluetooth, NFC, etc. Turning signal module 114 may include processing circuitry and hardware for initiating turn signaling, as well as providing audio and visual (e.g., via display module 110) indicia relating thereto. In one embodiment, modules 102-106 and 114 may be communicatively coupled to bus 112 for certain communication and data exchange purposes.

Vehicle 101 may further comprise a main processor 107 that centrally processes and controls data communication throughout the system 100 of FIG. 1. In some embodiments, processor 107 may comprise multiple processors and/or sub-processors, and may also include peripheral processing devices. Storage 108 may be configured to store data, operating systems, software, media, files and the like. Digital signal processor (DSP) 109 may comprise a processor separate from main processor 107, or may be integrated within processor 107. Generally speaking, DSP 109 may be configured to take signals, such as voice, audio, video, temperature, pressure, position, etc. that have been digitized and then process them as needed. Display 110 may be configured to provide visual (as well as audio) indicia from any module in FIG. 1, and may be a configured as one or more of LCD, LED, OLED, or any other suitable display. Additionally, display 110 may include one or more graphics processors to enable the modification and display of visual indicia.

Display may also be configured with audio speakers for providing audio output. Illustrative displays include, but are not limited to, instrument clusters, heads-up displays, navigation displays, entertainment module displays, and the like. Display 110 may be configured as one or more discrete displays, or may include one or more integrated displays providing multiple display functionalities (e.g., navigation, entertainment) within a single display. Input/output module 111 is configured to provide data input and outputs to/from other peripheral devices, such as keyboards, key pads, key fobs, device controllers and the like. As discussed above, modules 107-111 may be communicatively coupled to data bus 112 for transmitting/receiving data and information from other modules.

Figure 1A:
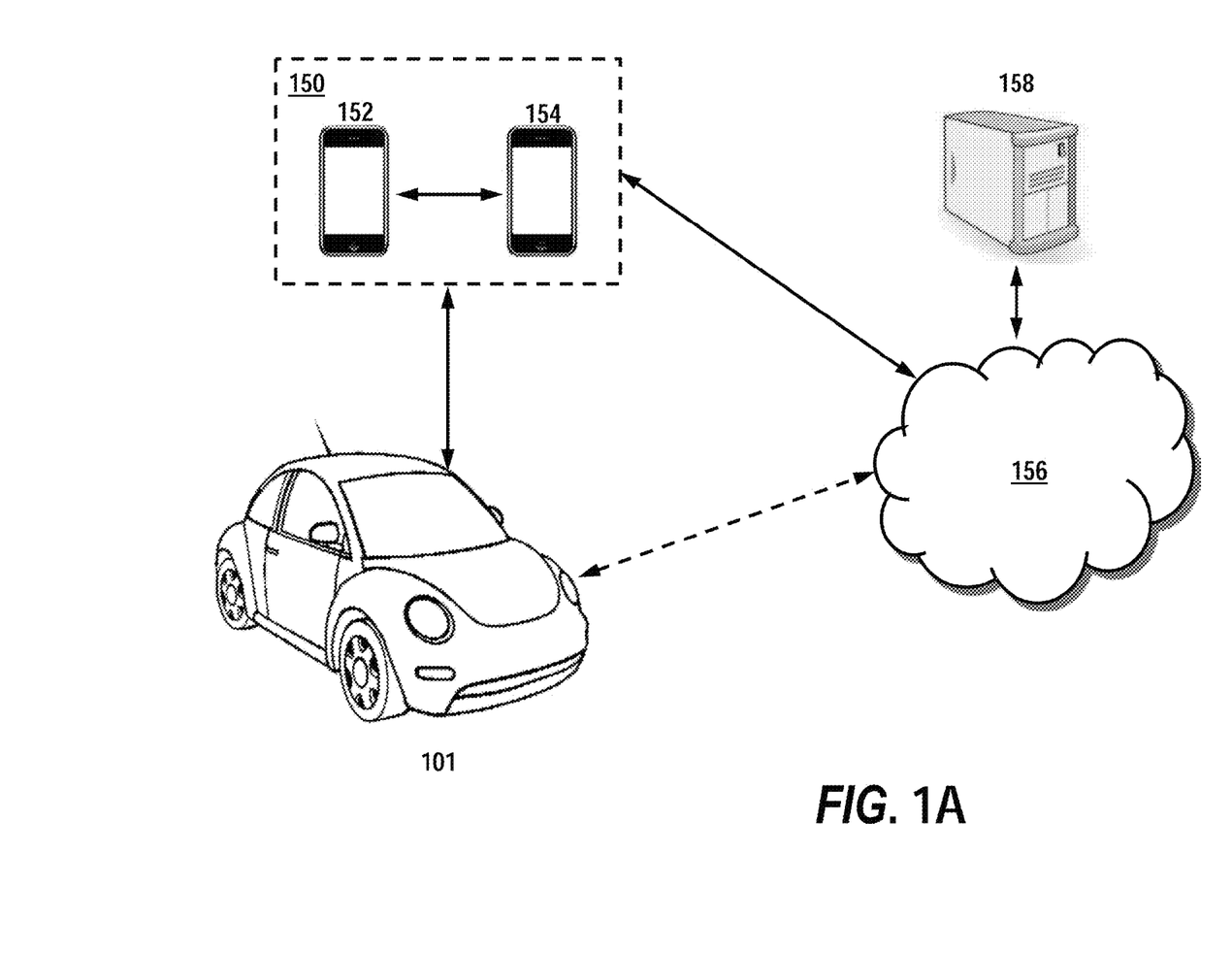
FIG. 1A illustrates an exemplary vehicle communication block diagram, where the vehicle of FIG. 1 may communicate with one or more networks, as well as one or more portable devices that also may be configured to communicate over the one or more networks.
Figure 2:
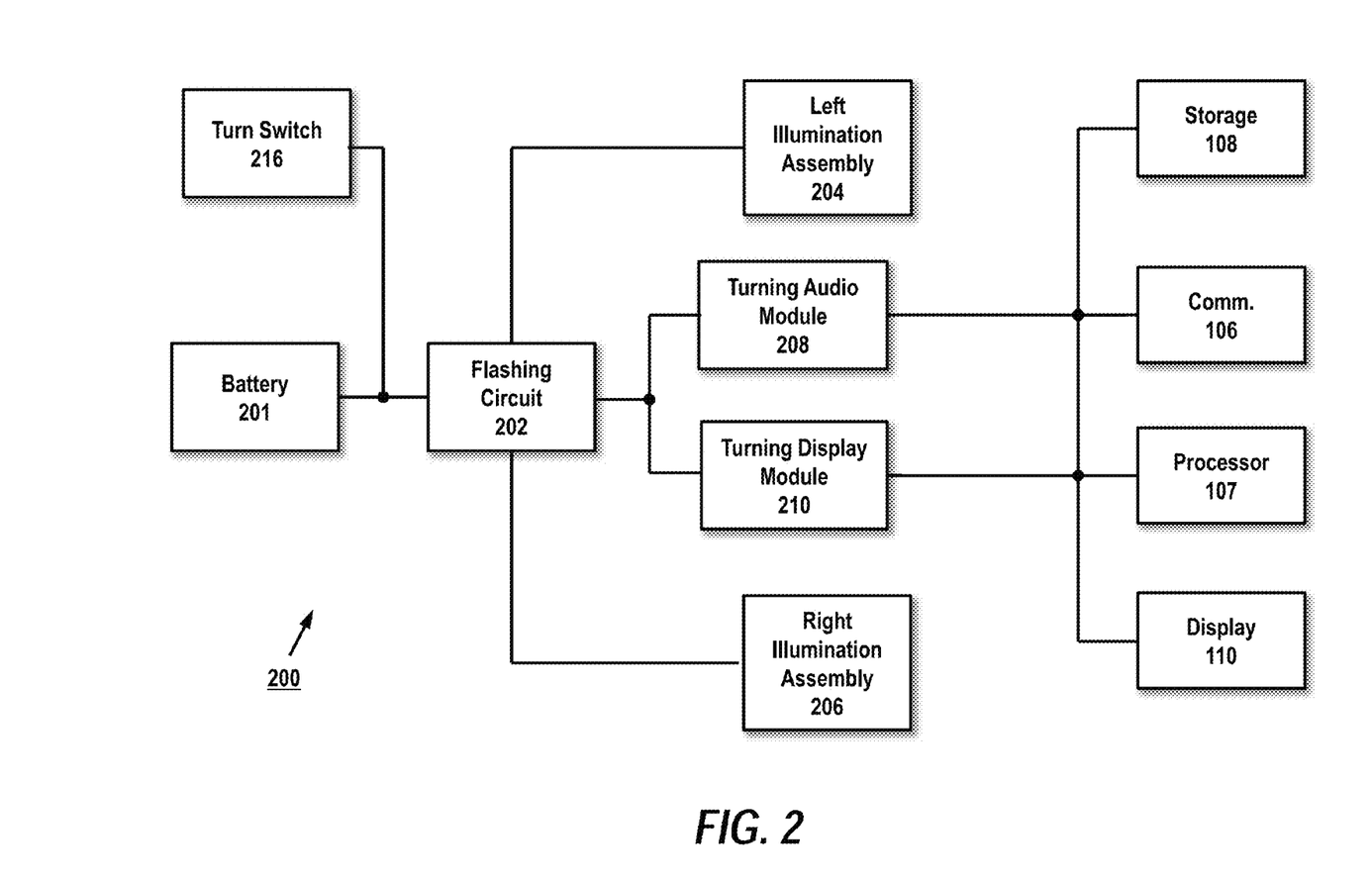
FIG. 2 illustrates a simplified block diagram of a turn signal modification arrangement comprising a processor for modifying a turn signal audio module under at least one embodiment.

Turning to FIG. 1A, an exemplary embodiment is illustrated, where a vehicle 101 (see FIG. 1), is paired with one or more devices 150 (152, 154) which may be registered to one or more users. Devices 150 may be registered with vehicle 101 using Bluetooth pairing or using Wi-Fi or NFC registration, as is known in the art. Preferably, device 150 registrations are stored (e.g., 108) at the vehicle according to a device ID or SIM ID, and may further include a device user profile associated with each ID that may include user device/vehicle usage history. In an illustrative embodiment, one or more user turn signal signaling preferences may be stored in devices 150 for use in vehicle 101. Of course, turn signal signaling preferences may be directly input into vehicle 101 instead of, or in addition to, devices 150. In the embodiment of FIG. 2, devices 152, 154 may configured to communicate turn signal signaling preferences with vehicle 101, and may be further configured to communicate with each other. Portable devices 150 are also configured to communicate with wireless network 156 in order to send/receive data from one or more central servers 158. Similarly, in one embodiment, vehicle 101 may also be configured to communicate with network 156. Server 158 may be also configured to perform back-end processing for devices 150 and vehicle 101, and further communicate with other remote servers for additional functionalities.

Turning now to FIG. 2, an illustrative embodiment 200 is provided for providing and controlling audio and visual indicia relating to turn signal switching. In the embodiment, turn signal system 200 comprises a battery 201 that provides power to turn signal system 200, as well as other devices, components and modules in vehicle 101. A portion of electrical power from battery 201 is provided to flashing circuit 202 as turn switch 216 (e.g., a turn stalk, configured within a vehicle steering column) is activated indicating either a left turn or a right turn. Flashing circuit 202 may be configured as a solid state flashing circuit, or may be configured as a flashing relay circuit. While flashing relay circuits are conventionally used for incandescent turn lamp configurations, such circuits are not typically compatible with modern light-emitting diode (LED) turn lamp configurations.

Depending on the orientation of the turn switch 216 (i.e., left turn, right turn), flashing circuit 202 provides a signal to either left illumination assembly 204 or right illumination assembly 206. Each of left illumination assembly 204 and right illumination assembly 206 may comprise a plurality of illumination elements, where each illumination element may comprise a single bulb, a plurality of bulbs (e.g., an LED lamp assembly), or an illumination portion on display 110 (e.g., turn signal indication on instrument cluster and/or heads-up display). For example, activating turn switch 216 for a left turn may cause flashing circuit 202 to transmit power to a left illumination assembly 204 comprising a front left bulb, a rear left bulb for intermittent illumination, and further provide a signal to display 110, via turning display module 210 to provide visual indicia of a left turn operation being activated by turn switch 216. In this non-limiting example, the front and rear bulbs, and display portion of display 110 may be considered portions of left illumination assembly 204.

In another example, activating turn switch 216 for a right turn may cause flashing circuit 202 to transmit power to the right illumination assembly 206 comprising a front right bulb, a rear right bulb for intermittent illumination, and further provide a signal to a right side-view mirror light assembly and to display 210, via turning display module 210, to provide visual indicia of a right turn operation being activated by turn switch 216. In this non-limiting example, the front and rear bulbs, the side-view mirror light assembly and the display portion of display 110 may be considered portions of right illumination assembly 206. It should be appreciated by those skilled in the art that multiple other types of illumination assemblies may be utilized for the present disclosure.

Continuing with the illustrative embodiment of FIG. 2, turning display module 210 may be configured to control the display characteristics of turning visual indicia on display 110. Such turning visual indicia characteristics may comprise graphics, text, animated graphics, and the like. Processor 107 may provide control instructions for turning display module (or work in conjunction with turning display module 210) to alter a type or frequency of display signals provided to display 110. In an illustrative embodiment, processor 107 may activate a display algorithm from storage 108 that alters the intermittent illumination frequency of a turn signal illumination provided from turning display module 210 to display 110. In another illustrative embodiment, processor 107 may activate a display algorithm from storage 108 to change a color or a type of graphic used to indicate a turn operation from turning display module 210 to display 110.

Turn signal system 200 also comprises a turning audio module 208 that is configured to generate turning audio (e.g., a turn click to coincide with intermittent illumination of an illumination assembly). Similar to turning display module 201, processor 107 may be configured to provide control instructions for turning audio module 208, or work in conjunction with turning audio module 208, to alter one or more audio characteristics of audio signals. The audio from turning audio module 208 may be provided to speakers of display 110, and/or may be provided to other speakers within vehicle 101. In an illustrative embodiment, processor 107 may activate an audio algorithm from storage 108 that alters one or more characteristics (e.g., volume, audible frequency, etc.) of audio generated by turning audio module 208. In another illustrative embodiment, processor 107 may activate an audio algorithm from storage 108 to change the kind of audio indicia used to indicate a turn operation from turning audio module 208. Turn signal system 200 may also be operatively coupled to communications 106, which may receive instructions for processor 107 to modify operation of turning display module 210 and/or turning audio module 208. Such instructions may be received from a remote device (e.g., 150) and stored in storage 108.

In some illustrative embodiments, turn switch 216, flashing circuit 202, left illumination assembly 204 and right illumination assembly 206 may be configured as a part of turning signal module 114 of FIG. 1. Turning audio module 208 and turning display module 210 may be embodied as application-specific integrated circuits (ASICs), or may be tangibly-embodied algorithms stored on storage 108 and executed by processor 107. In some illustrative embodiments, turning audio module 208 and turning display module 210 may be integrated together and/or integrated within processor 107 itself.

Figure 3:
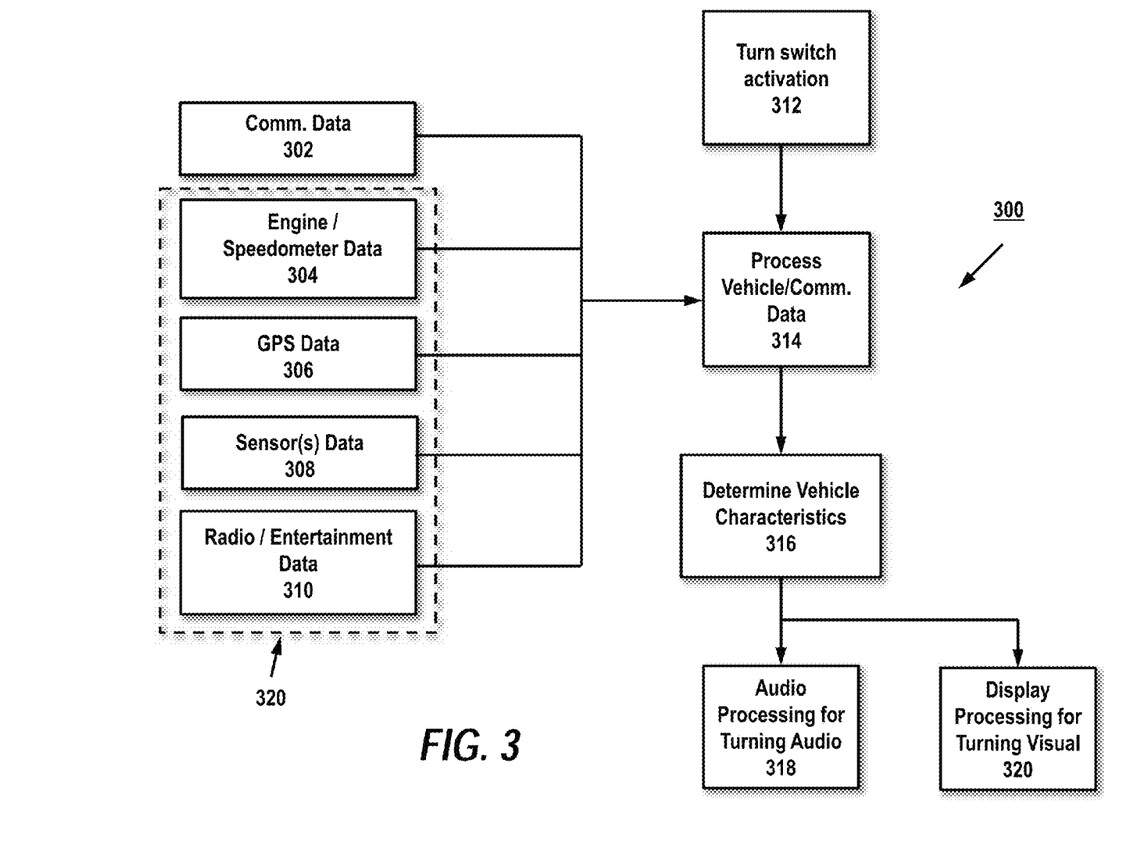
FIG. 3 illustrates a method for processing vehicle data to determine vehicle characteristics and processing audio signals for turning audio under at least one embodiment.

Turning now to FIG. 3, an illustrative process 300 is shown for processing vehicle data 320 and communication data 302 for altering audio and/or display generation in vehicle 101 when a turn switch is activated in block 312. As can be seen from block 320, the processor (e.g., 107) may receive vehicle and/or data inputs comprising communication data 302, engine/speedometer data 304, GPS data 306, data from one or more sensors 308 and radio/entertainment data 310. Communication data 302 may comprise data received from one or more remote devices, such as portable devices 150, wherein the data from once or more devices 150 may comprise instructions for processing vehicle data 320. Alternately or in addition, communication data 302 may comprise instructions for processing, enabling, disabling and/or modifying at least one of audio and visual indicia via turning audio module 208 and turning display module 210, discussed above. As will be explained in further detail below, each, some, all, or a combination of inputs 302, 320 are processed in block 314 (e.g., via processor 107), wherein a vehicle characteristic is determined by the processor 107 in block 316. Generally speaking, vehicle characteristics for the present application may include, but are not limited to, a vehicle speed, gear, engine RPM, braking activation, speed increase/decrease, a vehicle location determined by GPS module 103, activation of radio/entertainment module 105, vehicle sensor module 104 data, and the like.

As one or more vehicle characteristics are determined in block 316, pre-programmed instructions in storage 108 cause processor 107 to generate one or more instructions and/or data to turning audio module 208 and turning display module 210 in order to execute audio processing for turning audio in block 318 and/or display processing for visual in block 320. In other words, prior to, or during the activation of a turn switch (e.g., turn switch 216), processor 107 detects one or more specific vehicle conditions in or on vehicle 101. In response to a detected condition, instructions are provided to enable, disable and/or modify audio and/or visual indicia.

Under various embodiments, turn signal system 200 is configured to modify audio and/or visual indicia to maintain and/or increase awareness of turn signal activation, while minimizing aspects of audio/visual turn signal notification that may be distracting or annoying to a driver. In an illustrative embodiment, processor receives data relating to a vehicle's speed via engine/speedometer module 102. If the vehicle speed is detected below a specific amount (e.g., 10 mph), turning audio module 208 may be configured to disable audio for the turn signal. In addition, turning display module 210 may be configured to alter visual indicia for indicating turn switch activation. For example, turning display module 210 may alter the color and/or intensity of illumination in a turn signal icon, change an icon graphic on display 110, or provide additional illumination (e.g., activate a secondary light in or near the instrument cluster) at the same time turning audio module 208 disables audio. Such configurations are advantageous in that the unwanted turn signal clicking is minimized at a moment when a driver comes to a stop, while modified/heightened visual indicia provides the driver with clear knowledge that the turn switch is activated.

In other advantageous embodiments, further audio processing may be performed on the audio to minimize annoyance to a driver. For example, turning audio module 208 is configured with audio digital signal processing (DSP) circuitry (which may be incorporated in DSP module 109) allowing audio manipulation of the turn signal audio. Turning audio module 208 may be equipped with one or more audio filters comprising any of low-pass filters, high-pass filters and band-pass filters. By applying one, some or all of the filters alone or in combination, turn signal audio may be tuned such that frequencies objectionable to the drive may be filtered out. Such filters may be programmable, allowing processor 107 to apply filtering to achieve a desired effect.

Turning audio module 208 may also be equipped with a programmable variable-gain amplifier (also known as a voltage-controlled amplifier) that allows the volume of the turn signal audio to be gradually reduced and/or increased using processor 107. Thus, in one example, if a particular speed is detected (e.g., 10 MPH) and a reduced rate of speed is also detected, turning audio module 208 may gradually decrease the volume of the turn signal audio to a rate proportional to the reduced rate of speed. Similarly, as an increased rate of speed is detected from an initial speed (e.g., from 0 MPH) the volume of the turn signal audio may be proportionately increased as well. Of course, depending on the application and desired effect, the programmable variable-gain amplifier may be pre-set to decrease and/or increase turn signal volume according to a linear, logarithmic and/or exponential algorithm. Furthermore, the programmable variable-gain amplifier and programmable filters may be combined to provide additional audio processing to the turn signal audio. Using processor 107 and/or a graphics processor of display 110, visual indicia may be gradually modified as well (e.g., gradually increasing/decreasing illumination).

The algorithms for controlling/modifying turn signal audio and visual may be programmed directly into processor 107 and/or storage 108. Furthermore, algorithms may be obtained by devices 150 from a remote server (e.g., 158) and then downloaded to storage 108 when one of devices 150 connects or pairs with communications 106 of vehicle 101. Such a configuration advantageously provides highly customizable audio and/or visual preferences, and may allow for multiple audio and/or visual processing customizations for different drivers associated with different portable devices (152, 154). In some illustrative embodiments, drivers may create multiple customizable turning signal environments, either through I/O 111 or through devices 150, such that audio and/or visual processing may be altered "on the fly" to suit a particular mood of the driver. For example, a driver may create multiple turn signal notification environments, such as "city driving", "traffic jam", "night driving" or "open road", such that, when a particular driving environment is selected, the associated audio and/or visual processing algorithms are loaded for use by processor 107. Such a configuration may advantageously improve a driver's driving experience relative to turn signal notifications, in that unwanted audio and/or visual aspects of turn signal notification may be minimized, while still providing appropriate notification to maintain driver safety.

In addition to engine/speedometer data 304, other vehicle characteristics may be used to generate different audio and/or visual processing. By utilizing GPS data 306, for example, users may specify zones and/or geographic coordinates using a vehicle navigation unit or portable device navigation application in which specific audio/visual processing is performed on turning audio and visual(s). For example, a driver may specify an area on a navigational map that is within a specific geographical distance from a point of interest (e.g., "home"), which may be a subdivision comprising multiple closely-positioned roads and/or intersections. As the subdivision may contain multiple turns, but does not experience heavy general traffic, a user may specify in the audio algorithm that turn signal audio be made less audible or inaudible while the vehicle traverses this area. Alternately or in addition, the driver may specify different visual illumination characteristics in the geographic area as well.

Furthermore, vehicle sensor data 308 may be utilized to control audio and/or visual processing as well. For example, audio and/or visual turn signal notifications may be altered based on the detection of a vehicle brake being activated for longer than 5 seconds. Additional sensors, such as light sensors, may be used to modify the audio and/or illumination of turn signal notifications. Data 310 from radio/entertainment module 105 may also be used to control audio and/or visual processing. For example, a volume setting for an activated radio/entertainment module 105 may correlate to the volume and/or illumination of turn signal notification. As the volume of the radio/entertainment module 105 increases, the volume and illumination of a turn notification may increase as well. Alternately, if a driver wants to focus on the audio produced by radio/entertainment module 105, the audio volume of the turn notification may be reduced or filtered to make it less noticeable.

Figure 4:
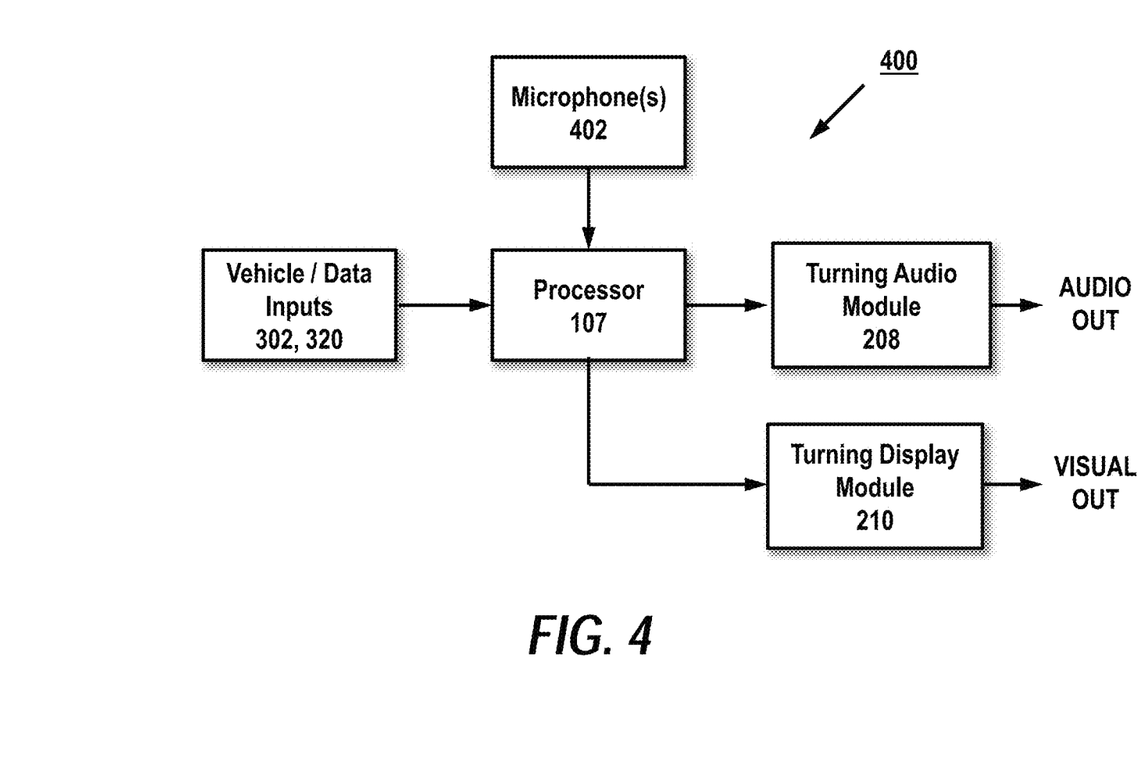
FIG. 4 illustrates another embodiment for processing turn signal audio and visual indicia utilizing a microphone under at least one embodiment.

Turning now to FIG. 4, another illustrative embodiment is shown, where processor 107 receives vehicle and data inputs 302, 320, and turning audio module 208 and turning display module 210 process turn signal notification similar to the embodiments described above in connection with FIGS. 2 and 3. In addition, a microphone 402 may provide input to processor 107. Microphone 402 may be a vehicle 101 microphone configured within a cabin area of vehicle 101, or alternately a microphone of a portable device 150. Microphone 401 may serve to provide audio data to processor 107 to monitor decibel levels within a cabin area of vehicle 101. Depending on the decibel level detected within the vehicle cabin area (which may also be considered a "vehicle characteristic" for the purposes of the present disclosure), processor 107 may alter turn signal audio to increase, as well as turn signal visual in some embodiments.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A system for processing turn signal data for a vehicle, the system comprising:
   a turning signal module for activating a turn signal for the vehicle;
   a turning audio module for generating audio indicia in response to the turn signal module activating the turn signal;
   a turning display module for generating visual indicia in response to the turn signal module activating the turn signal; and
   processing means for receiving and processing vehicle data to determine a vehicle characteristic, wherein the processing means is configured to provide modification data to modify (i) one or more audio characteristics of the audio indicia generated by the turning audio module and (ii) one or more visual characteristics of the visual indicia generated by the turning display module in response to the determined vehicle characteristic,
   wherein the processing means is configured to modify the audio characteristics by modifying at least one of a volume and a frequency of the audio characteristic based on the modification data provided based on the determined vehicle characteristic,
   wherein the processing means is configured to modify the visual characteristics by modifying an illumination, a frequency of illumination, and a graphic display of the visual characteristic based on the modification data provided based on the determined vehicle characteristic, and
   wherein the vehicle data comprises data received from one or more of an engine module, a speedometer module, a global positioning system (GPS) module, and a radio/entertainment module.

2. The system of claim 1, wherein the processing means is configured to receive communication data comprising instructions for providing the modification data.

3. The system of claim 2, wherein the communication data comprises instructions received from a portable device communicatively coupled to the vehicle, wherein the instructions are associated with a turning signal environment for the vehicle.

4. A method for processing turn signal data for a vehicle, the method comprising:
   activating, by a turning signal module, a turn signal for the vehicle;
   processing, by a processor, vehicle data to determine a vehicle characteristic;
   providing, by the processor, modification data in response to the determined vehicle characteristic to modify
   (i) one or more audio characteristics of audio indicia generated by a turning audio module in response to the turn signal module activating the turn signal based on the modification data provided based on the determined vehicle characteristic, and
   (ii) one or more visual characteristics, of visual indicia generated by a turning display module in response to the turn signal module activating the turn signal based on the modification data provided based on the determined vehicle characteristic wherein providing modification data comprises providing data to modify at least one of an illumination and a graphic display of the visual characteristic,
   wherein providing modification data comprises providing data to modify at least one of an illumination and a graphic display of the visual characteristic, and
   wherein processing vehicle data comprises processing data received from one or more of an engine module, a speedometer module, a global positioning system (GPS module, and a radio/entertainment module.

5. The method of claim 4, wherein providing modification data comprises providing data to modify at least one of a volume and a frequency of the one or more audio characteristics.

6. The method of claim 4, wherein providing modification data comprises providing data to gradually modify at least one of a volume and a frequency of the audio characteristic.

7. The method of claim 4, wherein providing modification data comprises.

8. The method of claim 4, further comprising receiving communication data comprising instructions for providing the modification data.

9. The method of claim 8, wherein the communication data comprises instructions associated with a turning signal environment for the vehicle.

10. The method of claim 8, wherein the communication data comprises instructions received from a portable device communicatively coupled to the vehicle.

11. A system for processing turn signal data for a vehicle, the system comprising:
- a turning signal module for activating a turn signal for the vehicle;
- a turning audio module for generating audio indicia in response to the turn signal module activating the turn signal;
- a turning display module for generating visual indicia in response to the turn signal module activating the turn signal; and
- a processor for receiving and processing vehicle data to determine a vehicle characteristic, wherein the processor is configured to provide modification data to modify (i) one or more audio characteristics of the audio indicia generated by the turning audio module based on the modification data provided based on the determined vehicle characteristic and (ii) one or more visual characteristics of the visual indicia generated by the turning display module in response to the determined vehicle characteristic based on the modification data provided based on the determined vehicle characteristic,
- wherein the vehicle data comprises data received from one or more of an engine module, a speedometer module, a global positioning system (GPS) module, and a radio/entertainment module, and
- wherein the processor is configured to modify the visual characteristic by modifying at least one of an illumination and a graphic display of the visual characteristic.

12. The system of claim 11, wherein the processor is configured to modify the audio characteristics by modifying at least one of a volume and a frequency of the audio characteristic.

13. The system of claim 11, wherein the processor is configured to gradually modify at least one of a volume and a frequency of the audio characteristic.

14. The system of claim 11, wherein the processor is configured to receive communication data comprising instructions for providing the modification data.

15. The system of claim 14, wherein the communication data comprises instructions associated with a turning signal environment for the vehicle.

16. The system of claim 14, wherein the communication data comprises instructions received from a portable device communicatively coupled to the vehicle.

* * * * *